US005798178A

United States Patent [19]

Sperling et al.

[11] Patent Number: 5,798,178

[45] Date of Patent: Aug. 25, 1998

[54] CARBON BRUSH AND PROCESS FOR IMPREGNATING SAME

[75] Inventors: Rainer Sperling, Biebertal; Harald Friedrich, Fernwald; Gunter Schardt, Giessen-Klein-Linden, all of Germany

[73] Assignee: Schunk Kohlenstofftechnik GmbH, Heuchelheim, Germany

[21] Appl. No.: 303,034

[22] Filed: Sep. 8, 1994

[30] Foreign Application Priority Data

Sep. 9, 1993 [DE] Germany .......................... 43 30 548.2

[51] Int. Cl.[6] .............................. B32B 9/00; A46B 00/00; B05D 3/02

[52] U.S. Cl. .......................... 428/408; 428/367; 428/396; 15/159.1; 427/372.2; 427/379; 427/384

[58] Field of Search .................................... 428/408, 367, 428/396, 902; 15/159.1; 427/430.1, 372.2, 379, 384, 385.5

[56] References Cited

U.S. PATENT DOCUMENTS

| | | | |
|---|---|---|---|
| 444,794 | 1/1891 | Cook | 428/408 |
| 2,066,176 | 12/1936 | Girvin et al. | 428/408 |
| 2,393,816 | 1/1946 | Savage | 428/408 |
| 2,412,701 | 12/1946 | Williford | 428/408 |
| 2,425,046 | 8/1947 | Ramadanoff | 428/408 |
| 2,597,708 | 5/1952 | Cresswell | 428/396 |
| 2,881,100 | 4/1959 | Hardman | 117/228 |
| 4,177,316 | 12/1979 | Diegelmann et al. | 428/367 |

*Primary Examiner*—Marion E. McCamish
*Assistant Examiner*—J. M. Gray
*Attorney, Agent, or Firm*—Dennison, Meserole, Pollack & Scheiner

[57] ABSTRACT

The invention relates to a carbon brush which is impregnated with a synthetic ester oil.

4 Claims, No Drawings

CARBON BRUSH AND PROCESS FOR IMPREGNATING SAME

BACKGROUND OF THE INVENTION

1. Field of the Invention

The invention is related to a carbon brush which is impregnated with an impregnating compound, particularly a carbon brush for tools put under a great deal of stress. The invention further relates to a process for impregnating a carbon brush or a carbon bar.

2. Description of the Prior Art

U.S. Pat. No. 949,988 discloses an impregnated carbon brush for electrical machines, having an impregnating compound that contains grease, wax, or oil as a lubricant. At normal temperature, the impregnating agents are either fluid or solid and in an impregnating bath, in which the carbon brush is impregnated, are brought to a temperature which is equal to or above the melting point of the lubricant. If petroleum jelly is used as an impregnating compound, for example, the impregnation temperature is adjusted to about 100° C. After the impregnation process, the carbon brush is subsequently treated at a temperature which is at least as high as the maximal operating temperature.

According to Examined German Patent Applications DE-AS 1 200 935 and 1 171 982, and Non-Examined German Patent Applications DE-OS 1 638 281 and 1 638 285, carbon brushes can be impregnated with esters. It is also possible to use on the one hand a mixture of polyoxidealkenediols and their esters and on the other hand, a mixture of aliphatic carboxylic acid having from 8 to 25 carbon atoms and salts of this acid (U.S. Pat. No. 2,425,046) as impregnating agents.

German Patent 26 09 834 C3 describes an impregnated carbon brush, which contains as its impregnating agent a nonmelting grease, a nonmelting wax, or a nonmelting oil; the grease, wax, or oil of the impregnating agent is intimately mixed with a gelling agent made of montmorillonite flakes, whose surfaces are coated with long-chain hydrocarbons, and in this way is converted to the nonmelting or nonfluid, harder, and abrasion-proof state. The impregnation is done by the vacuum pressure method.

Impregnated carbon brushes according to German Patent 26 09 834 C3 have proven in use to have the advantages of good commutation, lower spark interference, long service life, and usability at high power. It would be desirable, though, if these carbon brushes also could be improved with regard to the brush wear, collector wear, collector temperature occurring during operation, or the service life of the machine with which they are used, particularly if used in machines having temperature sensitive commutators which are asbestos-free.

SUMMARY OF THE INVENTION

The object of the present invention is to improve a carbon brush, and a process for impregnating same, of the prior art such that further improvements of the mechanical performance of the carbon brush can be achieved, and particularly that it can be used without problems in asbestos-free commutators. It should also be possible to achieve a further improvement of spark interference suppression as well as temperature endurance. In the impregnation process itself, a solvent should not be used. The impregnating agent should also be safe for the environment.

The problem is solved in a carbon brush by impregnating the carbon brush with a mixture of ester oil and a synthetic hydrocarbon oil.

The ester oil can preferably be a synthetic ester oil, such as carboxylic acid ester or dicarboxylic acid ester.

In particular, the carbon brush is impregnated with an ester oil that at 100° C. has a kinematic viscosity of approximately 14 $mm^2/s$, and at 40° C. has a kinematic viscosity of approximately 63 $mm^2/s$. The ester oil should also have a density at 20° C. of approximately 0.92 $g/m^3$.

If corresponding carbon brushes impregnated according to the invention are used, surprisingly a substantial reduction in the commutator temperature and an increase in the service life as well as a clear reduction in commutator corrosion can be ascertained. Consequently, corresponding carbon brushes are particularly suited for use in machines which have asbestos-free commutators.

It was possible to achieve a reduction in brush-collector wear as well as a reduction in the collector temperature, especially if the impregnating agent of the carbon brush amounts to roughly 0.5 to 15 weight percent, preferably about 5 weight percent.

In the process, the object is attained by impregnating the carbon brush in a mixture of ester oil and a synthetic hydrocarbon oil.

Surprisingly it has also been shown that the impregnation with the impregnating agent according to the invention need not be done by the vacuum pressure method; the carbon brush or the carbon bar need only be immersed in the mixture of ester oil and synthetic hydrocarbon oil for a certain period of time. Preferably the period of time is between 0.5 and 5 hours, particularly 1.5–2.5 hours. Afterwards, the carbon brush or the carbon bar is drained off and then, preferably by means of spinning, is dried at a temperature between 50° and 90° C., particularly at about 80° C., for a period of time of about 5–20 min, preferably for about 10 min. Then the carbon brush is ready for immediate use, or the carbon bar can be immediately machined to a desirable shape for the carbon brush.

Further details, advantages, and characteristics of the invention are revealed not only in the claims, the characteristics to be inferred from them - alone and/or in combination - but also in the example described below.

DESCRIPTION OF THE PREFERRED EMBODIMENTS

A carbon brush is immersed in an undiluted synthetic ester oil at room temperature for a period of about 2 hours, then is taken out and drained of ester oil. Then, the carbon brush is spin dried for 10 min at a temperature of approximately 80° C. The carbon brush was then ready for immediate use. It was not rinsed afterward.

A test of the carbon brush found that the weight percentage of the impregnating agent came to about 5%.

A corresponding carbon brush was then built into a saber saw in order to determine working time, brush wear, collector wear, achieved service life, and collector temperature. The trial runs were then compared with a carbon brush which was impregnated with known impregnating agents. The following results could be determined:

| Impregnating Agent | Brush Wear [μ/h] | Collector Wear [μ/h] | Service Life Achieved [h] | Collector Temp [°C.] |
|---|---|---|---|---|
| Prior Art | 188 | 2.75 | 47 | 60–160 |
| Impregnating Agent of the Invention | 60 | 0.6 | 150 | 50–80 |

We claim:

1. A carbon brush or carbon bar, which is impregnated with 0.5–15 weight percent of an impregnating agent consisting of a mixture of an ester oil selected from the group consisting of carboxylic acid ester oil and dicarboxylic acid ester oil and a synthetic hydrocarbon oil wherein said ester oil has a kinematic viscosity of approximately 14 $mm^2/S$ at a temperature of 100° C. and a kinematic viscosity of approximately 63 $mm^2/S$ at a temperature of 40° C.

2. A process for impregnating the carbon brush or the carbon bar of claim 1, comprising the steps of:

immersing said carbon brush or carbon bar in said mixture for a period of time t where t equals $0.5\ h<t<5\ h$;

removing excess mixture by draining; and drying said carbon brush or bar at a temperature T, where T equals $50°\ C.<T<90°\ C.$, wherein during said step of drying said carbon brush or the carbon bar is spin dried.

3. The process according to claim 2, wherein said carbon brush or carbon bar is dried for a period of time t where t is $15<t<20$ min.

4. A carbon brush or carbon bar impregnated with 0.5–15 weight percent of a non-solvent containing impregnant consisting of:

an ester oil selected from the group consisting of carboxylic acid ester and dicarboxylic acid ester oils having at 100° C. a kinematic viscosity of about 14 $mm^2/s$, at 40° C. a kinematic viscosity of about 63 $mm^2s$, and said ester oil having at 20° C. a density of about 0.92 $g/m^3$.

* * * * *